March 13, 1962 G. GUANELLA 3,025,480

HIGH FREQUENCY BALANCING UNITS

Filed March 24, 1959 3 Sheets-Sheet 1

INVENTOR
GUSTAV GUANELLA
BY [signature]
ATTORNEY

March 13, 1962 G. GUANELLA 3,025,480

HIGH FREQUENCY BALANCING UNITS

Filed March 24, 1959 3 Sheets-Sheet 2

INVENTOR
GUSTAV GUANELLA
BY [signature]
ATTORNEY

HIGH FREQUENCY BALANCING UNITS

Filed March 24, 1959 3 Sheets-Sheet 3

INVENTOR
GUSTAV GUANELLA
BY [signature]
ATTORNEY

1

3,025,480
HIGH FREQUENCY BALANCING UNITS

Gustav Guanella, 7/44 Im Schilf, Zurich 10, Switzerland, assignor of sixty percent to Karl Rath, New York, N.Y.

Filed Mar. 24, 1959, Ser. No. 801,584
Claims priority, application Switzerland Mar. 28, 1958
9 Claims. (Cl. 333—33)

The present invention relates to high frequency balancing units, or devices commonly known as baluns and serving to connect or couple an electrically balanced circuit or device with an unbalanced device, and vice versa, without requiring retuning of the circuits as when using conventional balancing transformers or networks. As an example, the invention is of special use for the connection of the dipole antenna of a television receiver with a coaxial or two-wire grounded transmission line connecting the antenna with the receiver input.

In the case of known balancing transformers used for the symmetrization of high frequency lines or devices, it has been customary to provide a wound up two-wire or Lecher line which, as far as symmetrical currents are concerned, behaves as a straight line, while offering considerable inductive impedance to unsymmetrical or in-phase currents. Balanced-to-unbalanced transformers of this type are described, for instance, in United States Patent 2,509,057. Since devices of this type behave analogously to an ideal transformer having a transformation ratio 1:1, it is possible by the combination of two or more devices to provide a balancing system having a transformation ratio differing from one. Thus, by connecting the inputs of two devices in series and connecting their outputs in parallel, there may be obtained a voltage input-output ratio of 2:1, corresponding to an impedance transformation ratio of 4:1.

Balancing devices of this and other well-known type as used by the prior art are both complicated in design and the number of parts required, as well as costly in the fabrication and assembly thereof.

Accordingly, it is a principal object of the present invention to avoid the disadvantages of the known devices by the utilization of a simple two-wire or Lecher line being passed through or mounted in a magnetic body having a permeability greater than one. By the provision of such a body or sheathing of the two wires, the inductive impedance offered to unsymmetrical or in-phase currents through the conductors is increased considerably, while the mutual inductance between the wires for symmetrical or oppositely-phased currents is increased to only a negligible extent. Arrangements of this type behave, therefore, analogously to a wound up two-wire line of the type described by the above patent and are suited for the symmetrization of high frequency devices for circuits.

The invention, both as to its further objects and novel aspects, will be better understood from the following detailed description, taken in reference to the accompanying drawings forming part of this specification and wherein:

FIGS. 1 to 13, and 15 to 18 illustrate diagrammatically and by way of example a number of embodiments of balancing converter or transformer constructions embodying the principles of the invention;

FIG. 14 is a substitute circuit explanatory of the function and operation of the invention;

FIGS. 19 to 26, 28 to 29, 31, 33 and 35 to 39 are illustrative of various practical applications of the invention utilizing a plurality of balancing devices, to obtain a desired impedance matching ratio, while FIGS. 27, 30, 32 and 34 are circuit diagrams explanatory of the function of same of the practical applications described and shown.

2

Figure 1:
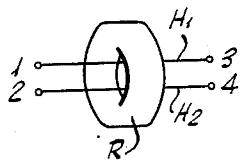

Like reference characters denote like parts throughout the different views of the drawings.

Referring more particularly to FIG. 1, the wires or conductors $H_1$ and $H_2$ of a two-wire line are passed through or mounted in an annular ferrite body R. An arrangement of this type offers an increased inductive impedance to equi-phased or unsymmetrical currents passing from the input terminals 1, 2 to the output terminals 3, 4, whereby the flow of such currents through the device will be minimized or suppressed. On the other hand, in case of symmetrical currents or currents flowing in the opposite direction through the wires $H_1$ and $H_2$, the magnetic fields in the ring or core R are substantially cancelled, whereby to pass such currents unopposedly through the device.

Figure 2:
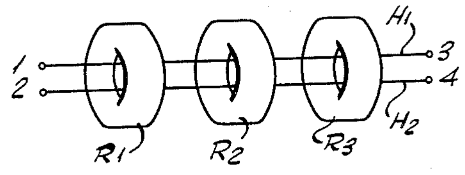
Figure 3:
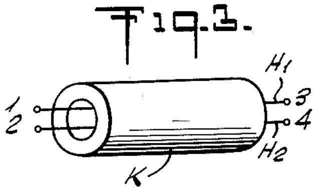

The foregoing effects may be increased by the provision of a number of ferrite rings $R_1$, $R_2$ and $R_3$ arranged in spaced relation from each other as shown in FIG. 2. In place of a number of rings, it is possible to provide a ferrite tube K of adequate length and closely enveloping a desired portion of the line $H_1$, $H_2$, as shown in FIG. 3. As will be understood, in place of the ferrite other magnetic materials may be used having a permeability being greater than one at least within the range of the operating frequencies to be transmitted. Alternatively, the rings or tubes may be comprised of a spirally wound magnetic wire or strip, or they may be composed of stacked sheets in accordance with well-known practice. Finally, the magnetic body K may be directly applied unto the insulated wires $H_1$ and $H_2$ in the form of a cover or coating of powdered magnetic material, in the manner being apparent and described in greater detail hereafter.

Figure 4:
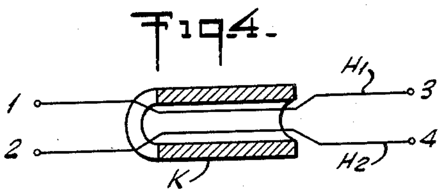

By the provision of a core of high permeability enveloping the wires $H_1$ and $H_2$, the mutual inductance between the wires is necessarily increased somewhat even for symmetrical or out-of phase currents flowing through the wires. In order to avoid abrupt changes or points of discontinuity of the wave impedance of the line at the ingress and egress points of the core K, the distance between the wires within the core may be reduced, as shown in FIG. 4. Alternatively, the capacity between the wires within the body K may be increased by the provision of a dielectric spacing material, to achieve a similar result. By these two expedients, the ratio $L/C$ between the mutual inductance and capacity per unit length of the wires, being determinative of the wave impedance, may be substantially equalized inside and outside of the core K, to prevent points of discontinuity and, in turn, energy reflection, phase errors and other drawbacks and defects well-known.

Figure 5:
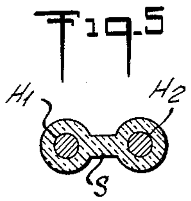
Figure 6:
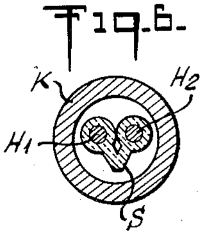
Figure 7:
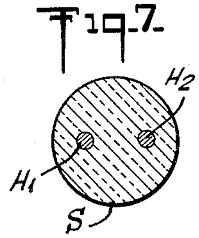

In order to maintain a desired distance between the wires $H_1$ and $H_2$, the latter may be embedded in an insulating material or carrier S, such as a plastic strip or the like, which may have a cross section as shown in FIG. 5. The central or connecting portion of the carrier S between the wires may be folded within the region of the body K, in an effort to minimize the total cross section of the device and to increase the capacity between the wires, in the manner shown in FIG. 6. A further increase of the effective capacity between the wires may be achieved by molding or embedding the same in an insulating material S, such as a suitable plastic having a high dielectric constant. As an example, the embedding material may have circular cross section, as shown in FIG. 7 with the body K being directly applied thereto in any suitable manner, as shown in FIG. 8.

Figure 8:
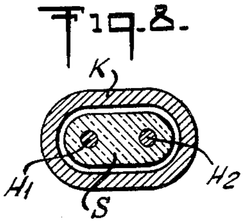

In order to ensure a maximum effective inductance, it is furthermore possible to use a ferrite body K and insulating carrier S of rectangular or elliptical cross-section, as shown in FIG. 8.

Figure 9:
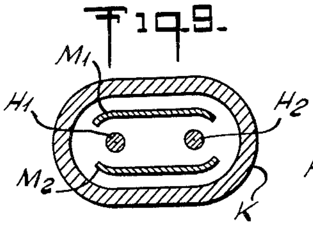
Figure 10:
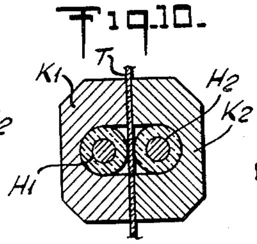

In order to reduce the electrical losses in the ferrite body K, metallic or electrical screening means may be provided between the wires $H_1$ and $H_2$ and the body K, such as by the provision of a pair of metallic screens $M_1$ and $M_2$ arranged parallel to the wires $H_1$ and $H_2$, as shown in FIG. 9. In order to further reduce the electrical losses in the body K, the latter may be provided with longitudinal slots parallel to the wires $H_1$, $H_2$. Finally, the body K may be divided into two parts $K_1$ and $K_2$ being separated by an insulating sheet or spacer T to achieve the same result, as shown in FIG. 10.

Figure 11:
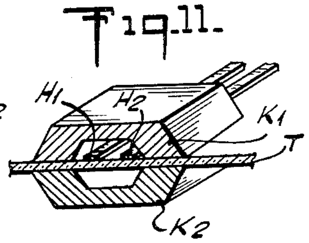
Figure 12:
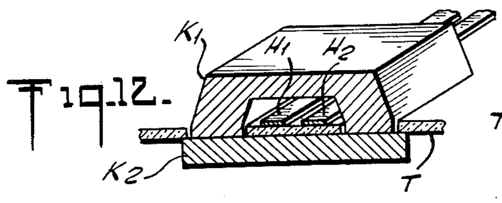

The wires $H_1$ and $H_2$ of the transmission line may furthermore be produced by means of a printed circuit technique or metallization of an insulating plate T as shown in FIG. 11, in which case plate T may additionally serve as a spacer between the core halves $K_1$ and $K_2$, to reduce the losses, in the manner pointed out. Furthermore, in order to reduce the reluctance of the magnetic circuit, the plate T may be provided with slots to accommodate the adjoining ends of one or both of the body halves $K_1$ and $K_2$, as shown in both FIG. 12 and FIG. 13, respectively. In FIGS. 11 and 12, the metallized strips $H_1$ and $H_2$ are shown applied in juxtaposition to one face of the plate T, while according to the FIG. 13 modification the strips are applied in registry to the opposite faces of said plate.

Figures 14, 15, 16, 17, 18, 19, 20, 21, 22, 23, 24, 25, 26, 27:
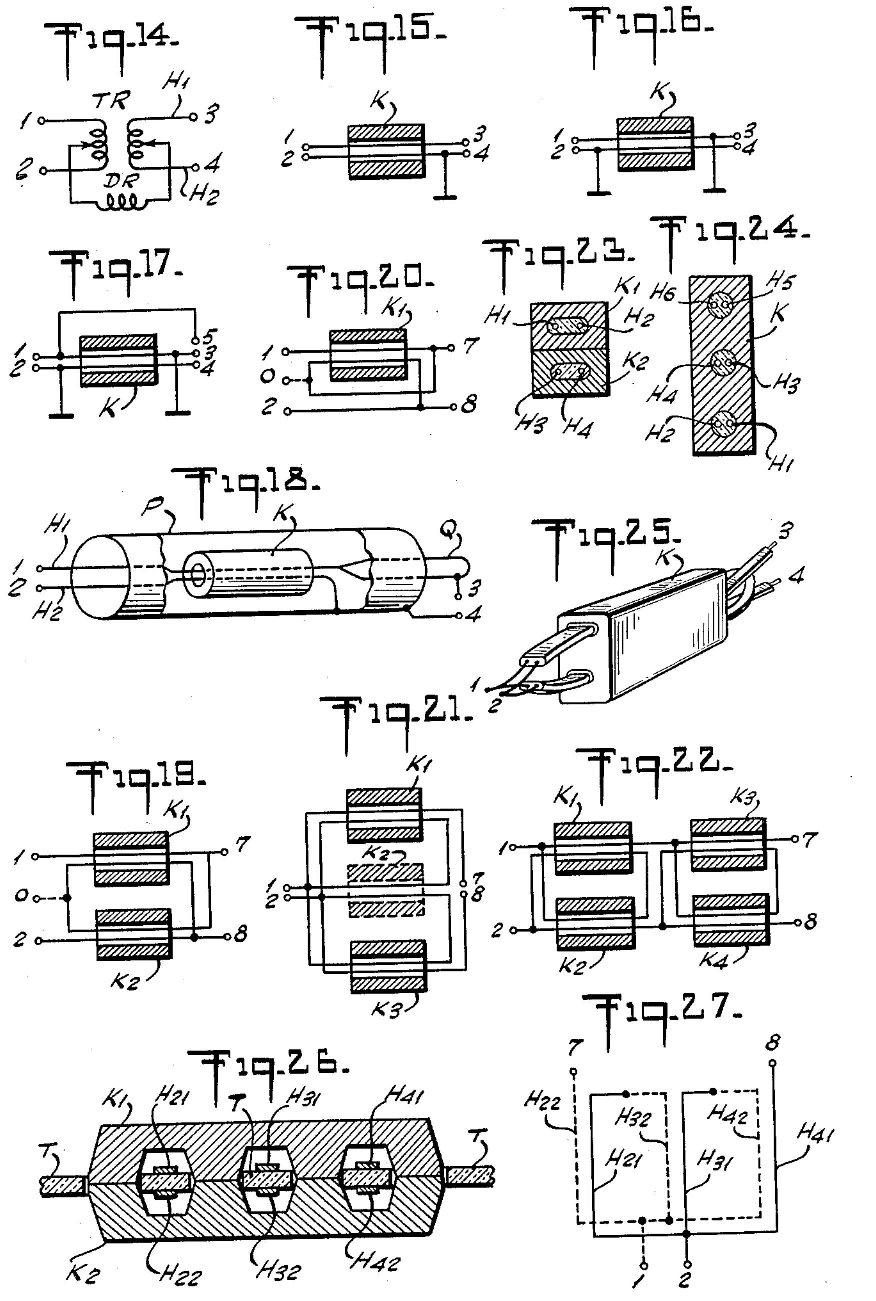

A two-wire line mounted in a ferrite body or tube according to the invention may be represented by the substitute electrical circuit as shown in FIG. 14. In the latter, the symmetrical currents flowing in opposite direction through the wires $H_1$, $H_2$ are transmitted through an ideal transformer TR having a pair of input terminals 1, 2 and output terminals 3, 4. The unsymmetrical or in-phase currents, on the other hand, encounter a considerable inductive reactance due to the presence of the ferrite body K, as represented by the choke coil DR in the diagram being connected between the center points of the primary and sectional winding of the transformer TR. If the body K has a sufficiently high magnetic permeability and length, the inductance DR will have such a value that it may be omitted for practical purposes. In this case, the device represents an ideal wide-band transformer TR substantially suppressing unsymmetrical currents. The electrical transit time of the device is represented in the diagram by the transit time of line $H_1$, $H_2$.

If the electrical length of the line $H_1$, $H_2$ is equal to one quarter of the operating wave length, the well-known transformation characteristics of a quarter wave line may be utilized. Thus, matching may be achieved between the impedances $Z_1$ and $Z_2$ connected to the input and output of the line, respectively, if the wave impedance $Z_0$ of the line $H_1$, $H_2$ equals the geometric means of the impedances $Z_1$, $Z_2$, to be matched, that is, if $$Z_0^2=Z_1\cdot Z_2 \quad (1)$$

However, for most practical purposes, the effect of the quarter wave transformation may be dispensed with and the length of the line may in most cases be less than one quarter of the operating wave length. In such a case, the wave impedance of the line should be equal to the impedances connected to the opposite ends of the line. With a sufficiently short line, the means value of the wave impedance $Z_0$ of the line, determined by the total mutual inductance L and the total capacity C of the line portions both inside and outside the ferrite body K, may be designed for all practical purposes to correspond with the impedances connected to the ends of the line.

Due to the suppression of the unsymmetrical currents it is possible, for instance, to ground one of the output terminals without regard to the corresponding input terminal, as shown in FIG. 15. For the same reason, it is possible to simultaneously ground, or connect to a common reference point, the input terminal of one wire and the output terminal of the other wire, as shown in FIG. 16. Finally, it is possible to ground one end of the input terminal to obtain a ground-symmetrical output, as shown in FIG. 17, inasmuch as the voltage between 3 and 5, as well as the voltage between 3 and 4 are equal to the voltage between the terminals 1 and 2.

FIG. 18 shows a practical embodiment of a balancing converter according to the invention for connecting a symmetrical line $H_1$, $H_2$ having a pair of input terminals 1, 2 to a coaxial line having output terminals 3, 4. For this purpose, the two conductors $H_1$ and $H_2$ of the symmetrical line are again passed through or mounted in a ferrite body K arranged preferably within the outer conductor or sheathing P of the coaxial line, with both conductors $H_1$ and $H_2$ being directly connected to the central conductor Q and to the outer conductor P, respectively, of the coaxial transmission line.

By the combination of two or more two-wire lines or devices of the type according to the invention, it is possible to secure a transformation ratio differing from one, as well be described in greater detail hereafter. As an example, since with a proper design of the inductance of the coil DR, FIG. 14, the latter may be practically neglected, it is possible, for instance, to connect the input of a pair of two-wire transformers or devices in series and to connect their outputs in parallel, as shown in FIG. 19. In the latter, the common input junction point will be at a potential intermediate between the potentials of the input terminals 1 and 2 and, if desired, may be connected to a special zero or neutral terminal 0, as indicated by the dotted line in the drawing. A combination of a pair of two-wire devices according to FIG. 19 results in a voltage transformation ratio of 2:1, corresponding to an impedance transformation ratio of 4:1. In an analogous manner, it is possible to connect the inputs in parallel and to connect the output in series, as will be readily understood.

With combinations of the foregoing type, the series inductance of the two-wire lines enables an effective separation between the input and output potentials at the various terminals, that is, making it possible to simultaneously ground, certain input and output terminals, respectively. Alternatively, a direct connection may be made between such input and output terminals. As an example, terminals 2 and 8 in FIG. 19 may be connected directly, whereby the body $K_2$ may be eliminated by virtue of the fact that the ends of the lower line are at the same potential resulting in the sum of the currents through this line being zero, while the currents through the upper line are equal and opposite, as a result of the effect of the ferrite body $K_1$. There is obtained, in this manner, a simplified arrangement comprising a pair of two-wire lines combined with a single ferrite core $K_1$, as shown in FIG. 20. In the latter, the transformation ratio is the same between the input terminals 1, 2 and the output terminals 7, 8 as in the case of FIG. 19, terminals 2 and 8 being again at the same potential.

By a series-parallel connection of three two-wire lines or devices having ferrite cores $K_1$, $K_2$ and $K_3$, there is obtained a system as is shown in FIG. 21. In the latter, the inputs of the lines are connected in parallel, while the outputs are connected in series, to result in a voltage transformation ratio of 3:1. In general, a combination of $n$ two-wire lines according to the invention will result in a total voltage transformation ratio of $n$:1 or 1:$n$, corresponding to an impedance transformation ratio $n^2$:1 or 1:$n^2$, respectively. By the use of combinations of a plurality of two-wire lines of the type described, it is also possible to omit some of the ferrite bodies, if the ends of a line passing through the body are at the same potential. Thus, in the case of FIG. 21, the central body $K_2$ may be omitted due to the fact that both the input terminals 1, 2 and the output terminals 7, 8 are symmetrical in respect to a common reference potential. For this reason, the body $K_2$ is shown by dotted lines in the drawing.

If the electrical transit time of the two-wire lines cannot be neglected, this must be taken into consideration, as indicated by the length of the line $H_1$, $H_2$ in the substitute diagram of FIG. 14. In order to avoid undesirable phase errors, care should be taken that the electrical transit times of the individual two-wire lines are exactly equal to each other. This can be achieved in a simple manner by an equal geometric design of the devices. Where some of the ferrite bodies are omitted, as in FIGS. 20 and 21, it is necessary that the electrical length of the lines having no ferrite body corresponds with the electrical length of the remaining two-wire lines.

For higher frequencies, that is, where the mutual inductance and capacity, as well as the electrical length of the two-wire lines, can no longer be neglected, it is necessary to make sure in combining such lines that each line has a predetermined wave impedance $Z_0$. In order to insure accurate electrical matching, the wave impedance should comply with the following conditions:

$$Z_1=n.Z_0 \quad (2)$$

$$Z_2=Z_0/n \quad (3)$$

wherein $Z_1$ is the outer impedance at the series-connected terminals and $Z_2$ is the outer impedance at the parallel-connected terminals of the system. From this, there follows:

$$Z_0^2=Z_1.Z_2 \quad (4)$$

On the other hand, the wave impedance is determined in a known manner by the following formula:

$$Z_0^2=L/C \quad (5)$$

wherein L represents the mutual inductance and C represents the capacity between the conductors of a single two-wire line. In the case of very high frequencies, the latter condition applies both to the free portions of the two-wire line, denoted by the index 1, as well as to the portions within the ferrite body, denoted by the index 2, that is, as follows:

$$Z_0^2=L_1/C_1=L_2/C_2 \quad (6)$$

In order to achieve a still higher transformation ratio, a combined series-parallel arrangement may be used repeatedly, in succession such as shown, for instance, by FIG. 22. In the latter, the first two two-wire devices having ferrite bodies $K_1$ and $K_2$ provide a transformation of 2:1, being followed by a pair of similar lines or devices having ferrite bodies $K_3$ and $K_4$, whereby the resultant transformation ratio of the combination will be equal to 1:4. In general, a first group of $n$ series-parallel arrangements combined with a second group of $n_2$ series-parallel arrangements will result in an overall transformation ratio of $1:(n_1.n_2)$. In arrangements of this type, the wave impedances $Z_{01}$ and $Z_{02}$ are related as follows:

$$Z_1=n_1.Z_{01}=n_1^2.Z_x=n_1^2.n_2.Z_{02}^2=n_1^2.n_2^2.Z_2 \quad (7)$$

wherein $Z_x$ represents the matching impedance at the transition point between the two series-parallel arrangements. When using similar series-parallel arrangements in this manner, it is also possible to eliminate certain magnetic bodies, if the respective conductors terminate at points having equal potentials. Thus, in an arrangement according to FIG. 22, the bodies $K_2$ and $K_4$ may be omitted, since terminals 2 and 8 are at the same potential.

Where a plurality of two-wire lines or devices are combined in the manner described herein, the ferrite bodies are advantageously of a square shape or cross section, so that they may be stacked upon each other, as shown in FIG. 23, or, alternatively, a single body may be provided having several openings for recesses for the mounting of the two-wire lines or devices, in the manner shown at $H_1$, $H_2$; $H_3$, $H_4$; $H_5$, and $H_6$ in FIG. 24.

FIG. 25 shows a practical example comprising two two-wire lines embedded in an insulating tape and mounted within the openings by a ferrite body K. In the example shown, the two-wire line starting at the terminals 1, 2 is passed through the lower opening of the body K and split at the point of emerging at the opposite end of said body for connection with the output terminals 3, 4. The line is then reversed by 180° and returned through the upper opening in the body, in such a manner that the conductor starting at 2 terminates at 3 and that the conductor returned from 4 terminates at 1.

In order to enable an easy assembly and mounting of the two-wire devices in the openings of the ferrite body, the latter may be divided into two halves with the separating plane thereof intersecting the openings. The lines may then be mounted simply and the two halves combined, if possible, by the interposition of an insulating space T, in the manner described and shown in FIG. 10.

Figure 13:
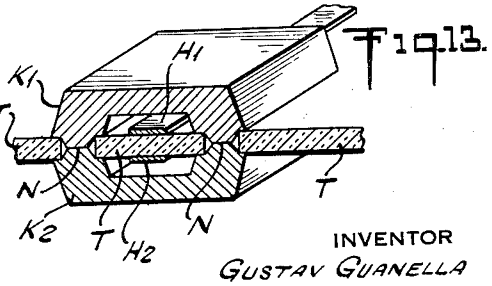

In the fabrication of a composite transformer system, printed circuit techniques may be utilized as described in reference to FIGS. 11 to 13. Thus, for instance, FIG. 26 shows a system comprising three series-parallel connected metallized two-wire lines $H_{21}$, $H_{22}$; $H_{31}$, $H_{32}$, and $H_{41}$, $H_{42}$ applied to a common insulating support or plate T. The ferrite body consists of two halves $K_1$ and $K_2$ enveloping all the two-wire lines or devices. In order to reduce the magnetic reluctance, the parts $K_1$ and $K_2$ are again shown directly adjoining one another by the provision of suitable longitudinal slots in the carrier T. The circuit connection to effect a series-parallel connection between the metalized conductors is shown schematically in FIG. 27, wherein the conductors above the carrier T are indicated in full line and the conductors below the carrier T are indicated on dotted lines.

Figures 28, 29, 30, 31, 32, 33, 34, 35, 36, 37, 38, 39:
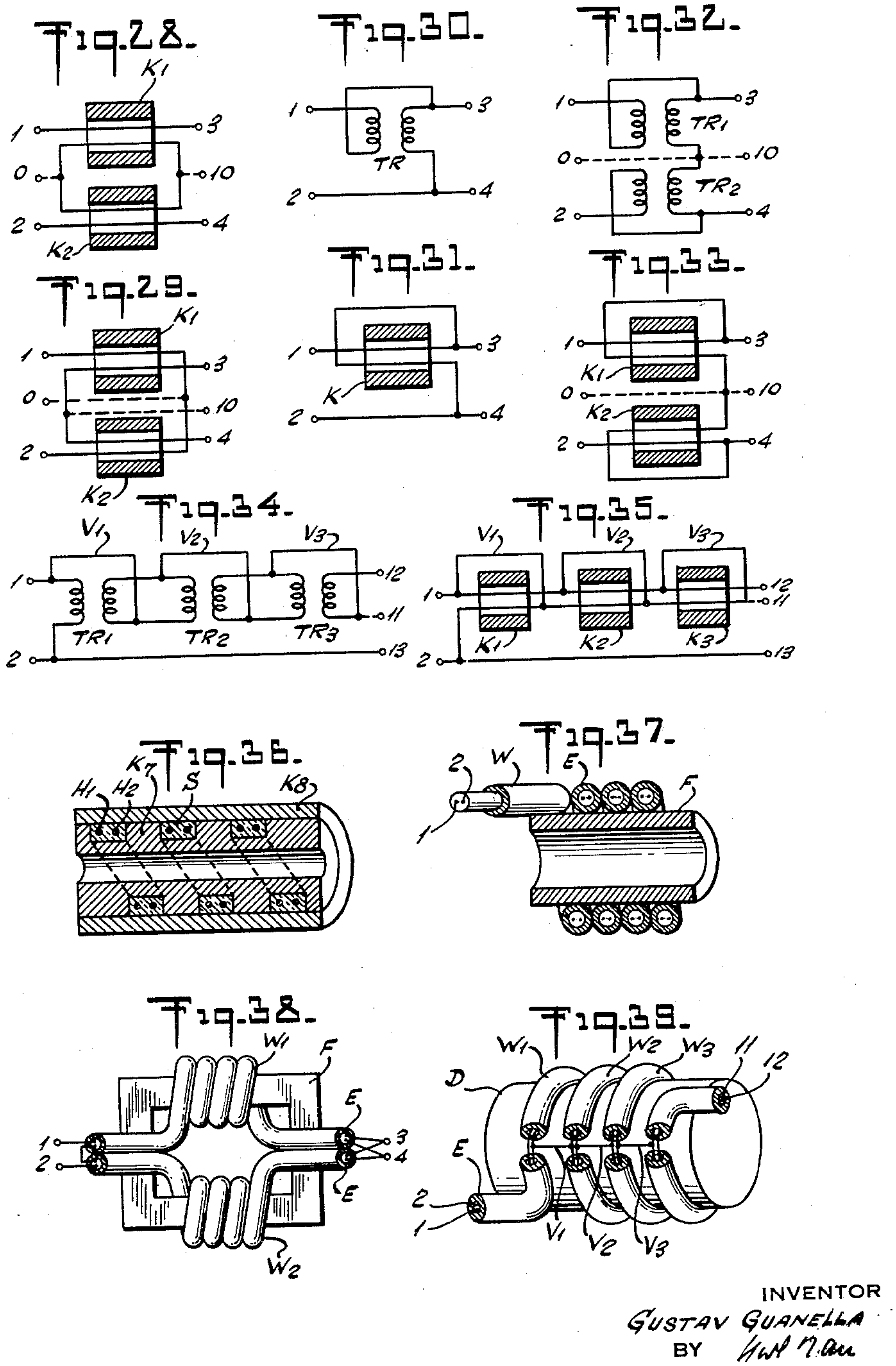

Further applications of two-wire lines or devices to effect electrical symmetrization are shown in FIGS. 28 and 29. In the arrangements according to FIG. 28, the two-wire lines are connected in series both as to the inputs and outputs thereof. Since the lines are represented by ordinary transformers in the substitute diagram, it is seen that the common junction points may be connected to separate terminals 0 and 10 being at a potential intermediate between the potentials of the input terminals 1, 2 and of the output terminals 3, 4. This, in turn, enables simple symmetrization of either the input or output relative to the intermediate reference potential.

If a galvanic separation is desired between the input and output terminals, an arrangement according to FIG. 29 may be used. In the latter, the two-wire lines may again be replaced by ordinary transformers and it is readily seen that the connecting leads to terminals 0 and 10 may be utilized to effect symmetrization of either the input or output circuits connected to the device.

The arrangement according to the invention may be further simplified and the field of application greatly enhanced, if the electrical length of the two-wire lines is small compared with one quarter of the operating wave length, that is, if the transit time and phase variations may be neglected. Thus, FIG. 30 shows a substitute circuit for a system to effect a voltage transformation of 2:1 by the transformer TR. By replacing this transformer by a two-wire arrangement and ferrite body K, a relatively simple construction results, as shown in FIG. 31, capable of effecting a voltage transformation of 2:1 between the input 1, 2 and the output 3, 4. By the combination of two such transformer systems according to FIG. 30 or 31 to form a symmetrical arrangement, there is obtained a substitute circuit as shown in FIG. 32, corresponding to the converter shown in FIG. 33. The central conductor may again be connected to the terminals 0 or 10, respectively, being at an intermediate potential relative to the input and output terminals.

By a cascade arrangement comprising several transformers $TR_1$, $TR_2$ and $TR_3$ and connecting leads $V_1$, $V_2$ and $V_3$, it is possible, as seen from the substitute circuit of FIG. 33, to raise the input potential at the terminal 1 by a factor or $n$ ($n$=number of transformers). In a cascade system of this type, the voltages within each transformer do not exceed the input voltage. A practical arrangement corresponding to the substitute circuit, FIG. 34, is shown in FIG. 35. By the combination of two such arrangements having a common central conductor 2, 13, there is obtained a symmetrical transformer system analogous to FIG. 33, resulting in the transformation of a symmetrical voltage at a ratio of 1:*n*.

FIGS. 36 to 39 illustrate a number of modified arrangements of the type where the length of the two-wire line passed through the body of high permeability is relatively great compared with the distance between the conductors of said line. In such a case, the insulating carrier S in which the wires $H_1$, $H_2$ are embedded may be mounted within a spiral groove of a symmetrical ferrite body $K_7$, FIG. 36, with the magnetic circuit surrounding the line being closed by a further ferrite tube $K_8$ concentrically surrounding the tube or body $K_7$, as shown by the drawing.

According to a further modification, the two-wire line may be in the form of a flexible tubular member or sheathing consisting of a material of high permeability with the line being spirally wound into a coil, to provide an additional inductive, effect in the manner further described hereinafter. Thus, referring to FIG. 37, there is shown a two-wire line W according to the invention being spirally wound upon the cylindrical carrier F with the sheathing or cover of high permeability material being shown by E. This results in an especially favorable utilization of space, where lines of considerable length are required. The cover or sheathing E may advantageously be comprised of a thin wire or strip spirally wound around the parallel wires of the line or the insulating carrier in which the wires are imbedded. Alternatively, a powdery ferromagnetic material may be directly applied to the insulated wires by a spraying, pressing or the like process, as will be readily understood by those skilled in the art.

In certain cases, the increased mutual inductance between the wires of the two-wire line as a result of the above mentioned sheathing of increased permeability may be insufficient, in particular, in the case of lower operating frequencies, for effecting a satisfactory symmetrization in the manner described. In such cases, the winding of the line into a coil results in a considerable improvement, inasmuch as the additional coil inductance acts to contribute to the suppression of the unsymmetrical currents. A further increase of this additional inductive effect may be achieved by the use of a support or carrier F also consisting of a material of high permeability.

On the other hand, the length of the wound up line in the case of high operating frequencies, being of the order of the operating wave length may be insufficient to produce the required inductive effect. In this case, it is advisable to so design the sheathing E of high permeability material as to obtain adequate symmetrization by this sheathing alone at the higher frequencies, that is, without the additional inductive effect mentioned. In the case of relatively lower frequencies, on the other hand, the currents are of practically the same phase along the entire line, whereby to enable the added inductance due to the winding of the line to become effective to its full extent. A sufficient suppression of the unsymmetrical currents is insured, therefore, by the provision of a ferrite core or support F, especially in the case of relatively low frequencies, where the sheathing E itself is inadequate to enable satisfactory symmetrization. In order to avoid undesirable electrical shielding by the sheating E, it is desirable to design the latter in such a manner as to have a sufficiently high resistance in the longitudinal direction.

In order to further increase the desired inductive or choking effect, an additional ferrite tube may be provided enclosing the wound up line W and being coaxial with the tube or support F. Finally, the magnetic circuit enveloping the wound up line may be closed by end members provided at the opposite ends of both ferrite tubes, or in any other suitable manner known.

The combination of a number of two-wire lines to achieve an impedance transformation as described herein with reference to the various examples shown, may furthermore be applied to wound up lines of the type according to FIG. 37. Thus, it is possible in certain cases, to utilize two wound two-wire systems $W_1$, $W_2$ mounted upon a common core F, in the manner shown in FIG. 38. By a suitable series-parallel connection of the two-wire lines, there may be achieved in this manner an impedance transformation of 4:1 analogous to the arrangement of FIG. 19. In the case of higher frequencies, symmetrization is practically insured by the effect of the sheathing E, whereas in the case of lower frequencies, the winding of the lines into a spiral coil mounted upon the core F will insure satisfactory results.

By winding the two-wire systems as shown, the connecting leads assume especially short dimensions, such as seen in FIG. 39 showing 3 two-wire systems $W_1$, $W_2$, $W_3$ in wound condition and being electrically connected in the manner indicated by FIG. 35. The connecting leads $V_1$, $V_2$, $V_3$ are especially short in this case, whereby additional undesirable inductive or transient effects are substantially avoided. As is understood, the mutual inductance between the wires may again be increased by the use of a core D having a sufficiently high permeability.

In order to avoid undesirable coupling between the individual turns of the wound up high frequency two-wire line, it is desirable to provide electrical screening for the sheathing of high permeability enveloping the line. By mounting the two-wire line in a metal tube, this would result in a decrease of the choking effect for the unsymmetrical currents. For this reason, a screening should be used exhibiting a high resistance in the direction of the line and having a low resistance transverse thereto. This result can be achieved simply by spirally winding a metallic wire around the line. In order to insure a more accurate electrical symmetry of the high frequency two-wire line, it is furthermore advisable to continuously twist the line around a medial line or axis. The two-wire line according to the invention embedded in the material of high permeability may furthermore be fabricated in a simple manner by winding the same around a core of high permeability. At the same time, the interstices between the winding turns may be filled with material of high permeability, to result in a magnetic body or cover completely enclosing the two-wire system. Such a two wire line or system may furthermore be constructed in several layers, whereby the individual layers are separated by a material of high permeability. Finally, the wound up two-wire line may be dipped in a plastic mass of magnetic material to result in a ferromagnetic core or body upon subsequent solidification of the material. According to an alternative method, the body or material of high permeability may be applied to the two-wire line by a spraying, pressing, molding or the like process, as will be readily understood.

In the foregoing, the invention has been described with reference to a number of specific illustrative devices and applications. It will be evident, however, that numerous variations and modifications, as well as the substitution of equivalent parts, devices or materials, may be made within the broader scope or spirit of the invention, as set forth in the appended claims. The specification and drawings are accordingly to be regarded in an illustrative rather than in a limiting sense.

I claim:

1. A four-terminal transmission device for high frequency signals comprising an insulating plate and a pair of parallel metallized strips applied to said plate, to form a two-wire transmission line, the adjoining pairs of ends of said line constituting the input and output terminals of said device, and a two-part hollow member of high resistivity magnetic material having a permeability greater than one and arranged with the component parts thereof mounted upon opposite sides of said plate, said member forming a magnetic enclosure closely encircling both said strips of said line.

2. A four-terminal transmission device for high frequency signals comprising a two-wire transmission line being constituted by a pair of parallel wires embedded in a flexible insulating carrier, a layer of high resistivity magnetic material having a permeability greater than one upon said carrier, to provide a composite flexible member comprising said line, said carrier and said layer, said member being wound into a bifilar spiral coil with the opposite projecting ends of said line forming the input and output terminals of said device.

3. In a transmission device as claimed in claim 2, said coil being wound upon a cylindrical core of magnetic material.

4. In a transmission device as claimed in claim 2, said coil being wound upon a cylindrical core of magnetic material with the adjacent turns thereof in close engagement with one another.

5. A transmission device for high frequency signals comprising a plurality of transmission line coils as described in claim 2, a common magnetic core supporting said coils, and means to interconnect the inputs and outputs of said coils, to provide a desired input-output impedance ratio of the composite transmission device comprised by said coils.

6. A transmission device for high frequency signals comprising a plurality of transmission line coils as described in claim 2, a closed magnetic core interlinking said coils, and means to interconnect the inputs and outputs of said coils, to provide a desired input-output impedance ratio of the composite transmission device comprised by said coils.

7. In a wide-band transmission device as claimed in claim 2, said layer of magnetic material having a thickness to provide high inductivity of said coil for unsymmetrical currents having frequencies corresponding to the upper partial frequency range of a desired frequency band to be passed by said device, and the coil mode inductance of said device providing adequate inductivity for the unsymmetrical currents within the lower frequency range of said band.

8. In a wide-band transmission device as claimed in claim 2, said layer consisting of a ferrite having a thickness to provide adequate inductivity of said line to suppress unsymmetrical currents having frequencies corresponding to the upper partial frequency range of a desired frequency band to be passed by said device, and the coil mode inductance of said device providing an adequate inductivity to suppress unsymmetrical currents within the lower frequency range of said band.

9. A four-terminal transmission device for high frequency signals comprising an insulating plate, a pair of metallized strips applied in registering relation to the opposite faces of said plate, to form a two-wire transmission line, and a hollow member consisting of high resistivity magnetic material having a permeability greater than one and enclosing both said strips, said member being composed of two U-shaped parts arranged with the legs of one U abutting the legs of the other U and mounted in slots of said plate adjoining said strips.

References Cited in the file of this patent

UNITED STATES PATENTS

| | | |
|---|---|---|
| 2,436,427 | Ginzton | Feb. 24, 1948 |
| 2,509,057 | Guanella | May 23, 1950 |
| 2,752,577 | Polk | June 26, 1956 |
| 2,865,006 | Sabaroff | Dec. 16, 1958 |